United States Patent [19]

Fujikawa et al.

[11] Patent Number: 4,972,260
[45] Date of Patent: Nov. 20, 1990

[54] APPARATUS FOR CODING A MOVING-PICTURE SIGNAL

[75] Inventors: Wataru Fujikawa, Yokohama; Satoshi Matsuya, Sagamihara; Akiyoshi Tanaka, Kawasaki, all of Japan

[73] Assignee: Matsushita Electric Industrial Co., Ltd., Japan

[21] Appl. No.: 397,207

[22] Filed: Aug. 22, 1989

[30] Foreign Application Priority Data

Aug. 22, 1988 [JP] Japan .................................. 63-207626
Aug. 22, 1988 [JP] Japan .................................. 63-207627

[51] Int. Cl.⁵ .......................... H04N 7/18; H04N 7/12
[52] U.S. Cl. ..................................... 358/136; 358/135; 358/105
[58] Field of Search ................ 358/133, 135, 136, 105

[56] References Cited

U.S. PATENT DOCUMENTS

| | | | |
|---|---|---|---|
| 4,668,987 | 5/1987 | Matsuda et al. | 358/136 |
| 4,672,444 | 6/1987 | Bergen et al. | 358/133 |
| 4,689,672 | 8/1987 | Furukawa et al. | 358/136 |
| 4,734,767 | 3/1988 | Kaneko et al. | 358/133 |
| 4,809,067 | 2/1989 | Kikuchi et al. | 358/136 |
| 4,837,632 | 6/1989 | Kubo et al. | 358/136 |
| 4,894,713 | 1/1990 | Delogne et al. | 358/133 |

FOREIGN PATENT DOCUMENTS 0290085 11/1988 European Pat. Off. .

OTHER PUBLICATIONS

"Advances in Image Processing", SPIE vol. 804, pp. 385-394, 1987.
"Description of Ref. Model 5 (RM5)", CCITT SGXV, Document #339, Mar. 1988.
"Line Transmission of Non-Telephone Signals"; "Transmission of Sound-Programme and Television Signals", CCITT, Red Book, vol. III, Fascicle III.4 Oct., 1984.

Primary Examiner—John K. Peng
Attorney, Agent, or Firm—Lowe, Price, LeBlanc, Becker and Shur

[57] ABSTRACT

An apparatus for coding a moving-picture signal comprises a first memory temporarily memorizing an input picture signal of one frame. A block of the picture signal, which corresponds to a central portion of the frame, is firstly read out from the first memory and then other blocks of the picture signal are sequentially read out from the first memory in a predetermined order. Each of the blocks of the picture signal has a predetermined number of adjacent pixels. A transform device transforms each block of the picture signal read out from the first memory into transmission information. A second memory stores the transmission information and has a capacity which adaptively varies with a position of the block relative to the frame. A quantizer adaptively quantizes an output from the transform device in accordance with a quantity of the transmission information stored in the second memory and with the position of the block relative to the frame.

6 Claims, 15 Drawing Sheets

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 1 | 1 | 1 | 1 | 1 | 1 | 1 | 1 | 1 | 1 |
| 1 | 1 | 1 | 1 | 1 | 1 | 1 | 1 | 1 | 1 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

FIG. 13

| 0 | 0 | 0 | 0 | 1 | 1 | 0 | 0 | 0 | 0 |
|---|---|---|---|---|---|---|---|---|---|
| 0 | 0 | 0 | 0 | 1 | 1 | 0 | 0 | 0 | 0 |
| 0 | 0 | 0 | 0 | 1 | 1 | 0 | 0 | 0 | 0 |
| 0 | 0 | 0 | 0 | 1 | 1 | 0 | 0 | 0 | 0 |
| 0 | 0 | 0 | 0 | 1 | 1 | 0 | 0 | 0 | 0 |
| 0 | 0 | 0 | 0 | 1 | 1 | 0 | 0 | 0 | 0 |
| 0 | 0 | 0 | 0 | 1 | 1 | 0 | 0 | 0 | 0 |
| 0 | 0 | 0 | 0 | 1 | 1 | 0 | 0 | 0 | 0 |
| 0 | 0 | 0 | 0 | 1 | 1 | 0 | 0 | 0 | 0 |
| 0 | 0 | 0 | 0 | 1 | 1 | 0 | 0 | 0 | 0 |

FIG. 14

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 1 | 1 | 1 | 1 | 1 | 1 | 0 | 0 |
| 0 | 0 | 1 | 1 | 1 | 1 | 1 | 1 | 0 | 0 |
| 0 | 0 | 1 | 1 | 1 | 1 | 1 | 1 | 0 | 0 |
| 0 | 0 | 1 | 1 | 1 | 1 | 1 | 1 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

FIG. 15

| 1 | 1 | 1 | 1 | 1 | 1 | 1 | 1 | 1 | 1 |
|---|---|---|---|---|---|---|---|---|---|
| 1 | 1 | 1 | 1 | 1 | 1 | 1 | 1 | 1 | 1 |
| 1 | 1 | 1 | 1 | 1 | 1 | 1 | 1 | 1 | 1 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

FIG. 16

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |

FIG. 17

| 0 | 0 | 0 | 0 | 0 | 0 | 0 | 1 | 1 | 1 |
|---|---|---|---|---|---|---|---|---|---|
| 0 | 0 | 0 | 0 | 0 | 0 | 0 | 1 | 1 | 1 |
| 0 | 0 | 0 | 0 | 0 | 0 | 0 | 1 | 1 | 1 |
| 0 | 0 | 0 | 0 | 0 | 0 | 0 | 1 | 1 | 1 |
| 0 | 0 | 0 | 0 | 0 | 0 | 0 | 1 | 1 | 1 |
| 0 | 0 | 0 | 0 | 0 | 0 | 0 | 1 | 1 | 1 |
| 0 | 0 | 0 | 0 | 0 | 0 | 0 | 1 | 1 | 1 |
| 0 | 0 | 0 | 0 | 0 | 0 | 0 | 1 | 1 | 1 |
| 0 | 0 | 0 | 0 | 0 | 0 | 0 | 1 | 1 | 1 |
| 0 | 0 | 0 | 0 | 0 | 0 | 0 | 1 | 1 | 1 |

FIG. 18

| 1 | 1 | 1 | 0 | 0 | 0 | 0 | 0 | 0 | 0 |
|---|---|---|---|---|---|---|---|---|---|
| 1 | 1 | 1 | 0 | 0 | 0 | 0 | 0 | 0 | 0 |
| 1 | 1 | 1 | 0 | 0 | 0 | 0 | 0 | 0 | 0 |
| 1 | 1 | 1 | 0 | 0 | 0 | 0 | 0 | 0 | 0 |
| 1 | 1 | 1 | 0 | 0 | 0 | 0 | 0 | 0 | 0 |
| 1 | 1 | 1 | 0 | 0 | 0 | 0 | 0 | 0 | 0 |
| 1 | 1 | 1 | 0 | 0 | 0 | 0 | 0 | 0 | 0 |
| 1 | 1 | 1 | 0 | 0 | 0 | 0 | 0 | 0 | 0 |
| 1 | 1 | 1 | 0 | 0 | 0 | 0 | 0 | 0 | 0 |
| 1 | 1 | 1 | 0 | 0 | 0 | 0 | 0 | 0 | 0 |

FIG. 19

| 1 | 1 | 1 | 1 | 1 | 1 | 1 | 1 | 1 | 1 |
|---|---|---|---|---|---|---|---|---|---|
| 1 | 1 | 1 | 1 | 1 | 1 | 1 | 1 | 1 | 1 |
| 1 | 1 | 0 | 0 | 0 | 0 | 0 | 0 | 1 | 1 |
| 1 | 1 | 0 | 0 | 0 | 0 | 0 | 0 | 1 | 1 |
| 1 | 1 | 0 | 0 | 0 | 0 | 0 | 0 | 1 | 1 |
| 1 | 1 | 0 | 0 | 0 | 0 | 0 | 0 | 1 | 1 |
| 1 | 1 | 0 | 0 | 0 | 0 | 0 | 0 | 1 | 1 |
| 1 | 1 | 0 | 0 | 0 | 0 | 0 | 0 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |

APPARATUS FOR CODING A MOVING-PICTURE SIGNAL

BACKGROUND OF THE INVENTION

This invention relates to an apparatus for coding a signal representing moving images or pictures which is usable in various systems such as a video-telephone system or a conference television system.

European patent publication EP290085 and "Advances in Image Processing", SPIE Vol. 804, pp 385-394, 1987 disclose apparatuses for coding a signal representing moving images. These prior art apparatuses include a buffer memory storing code signals. In the prior art apparatuses, when the quantity of the code signals stored in the buffer memory exceeds a given quantity, the coding is suspended to prevent an increase in the quantity of the generated code signals. The suspension of the coding tends to cause a block distortion within a frame or an unsmooth motion of images represented by the code signals.

SUMMARY OF THE INVENTION

It is an object of this invention to provide an improved apparatus for coding a moving-picture signal.

According to a first aspect of this invention, an apparatus for coding a moving-picture signal comprises a first memory temporarily memorizing an input picture signal of one frame; means for firstly reading out a block of the picture signal, which corresponds to a central portion of the frame, from the first memory and then sequentially reading out other blocks of the picture signal from the first memory in a predetermined order, wherein each of the blocks of the picture signal has a predetermined number of adjacent pixels; means for transforming each block of the picture signal read out from the first memory into transmission information; a second memory storing the transmission information and having a capacity which adaptively varies with a position of the block relative to the frame; and a quantizer adaptively quantizing an output from the transforming means in accordance with a quantity of the transmission information stored in the second memory and with the position of the block relative to the frame.

According to a second aspect of this invention, an apparatus for coding a moving-picture signal comprises a first memory temporarily memorizing an input picture signal of one frame; means for determining an order of reading out the picture signal from the first memory in accordance with a distribution of motion vectors in a preceding frame; means for sequentially reading out blocks of the picture signal from the first memory in the determined reading order, wherein each of the blocks of the picture signal has a predetermined number of adjacent pixels; means for transforming each block of the picture signal read out from the first memory into transmission information; a second memory storing the transmission information and having a capacity which adaptively varies with an order of coding of the picture signal block; and a quantizer adaptively quantizing an output from the converting means in accordance with a quantity of the transmission information stored in the second memory and with the order of coding of the picture signal block.

BRIEF DESCRIPTION OF THE DRAWINGS

FIGS. 7-11 are diagrams showing the orders of reading out the picture signal blocks from the frame memory in the apparatus of FIG. 6.

FIGS. 12-19 are diagrams showing the predetermined patterns of the distribution of the motion vectors in the apparatus of FIG. 6.

DESCRIPTION OF THE FIRST PREFERRED EMBODIMENT

Figure 1:
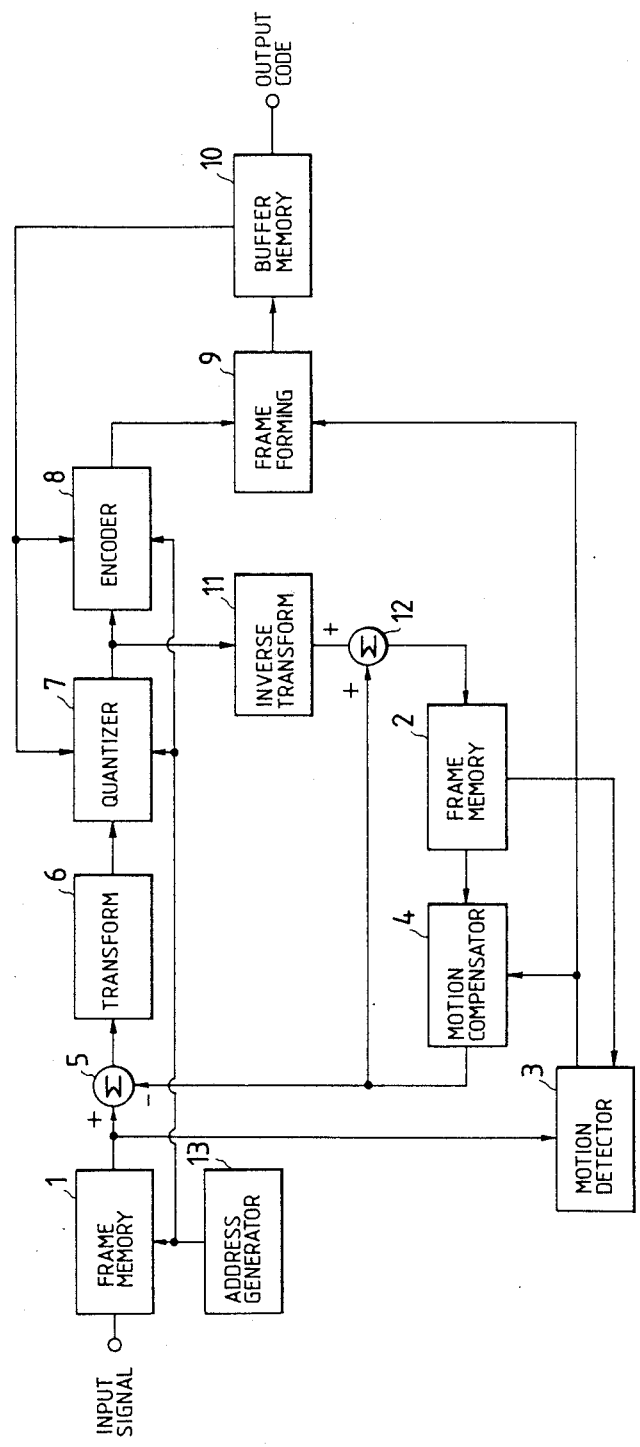
FIG. 1 is a block diagram of an apparatus for coding a moving-picture signal according to a first embodiment of this invention.

With reference to FIG. 1, a frame memory 1 temporarily holds a quantity of codes for an input digital picture or video signal corresponding to one frame. Writing and reading the picture signal into and from the memory 1 is controlled in accordance with address signals fed from an address generator 13. During writing of the signal into the memory 1, the input picture signal is divided into parts which are sequentially written into segments of the memory 1. During reading of the signal from the memory 1, the parts of the picture signal are read in a predetermined sequence. The picture signal read out from the memory 1 is fed to a motion detector (a motion or displacement estimator) 3 and a subtracter 5. As will be made clear hereinafter, a picture signal read out from a frame memory 2 precedes the picture signal outputted from the memory 1 by a one-frame period. The address signal from the address generator 13 is used in reading out the picture signal from the frame memory 2 so that same signal blocks of the current and preceding frames can be read out from the respective frame memories 1 and 2 at essentially the same time. The motion detector 3 detects motion vectors on the basis of the current picture signal and the preceding picture signal read out from the memories 1 and 2. A motion compensator 4 determines a reference block on the basis of the motion vector represented by an output signal from the motion detector 3. The motion compensator 4 outputs a signal representative of the reference block to the subtracter 5 and an adder 12.

The subtractor 5 calculates the difference between the reference block and the corresponding block of the picture signal read out from the memory 1. An output signal from the subtractor 5 is subjected to an orthogonal transform by a section 6. An adaptive quantizer 7 adaptively quantizes an output signal from the orthogonal transform section 6. An encoder 8 encodes an output signal from the quantizer 7 into variable-length codes. A frame forming section (a multiplexer) 9 combines the codes and the motion vectors, represented by output signals from the encoder 8 and the motion detector 3, into transmission codes of a given format. An output signal from the frame forming section 9 which represents the transmission codes is temporarily stored in a buffer memory 10 and is then transmitted from the memory 10 to a transmission line (not shown).

The output signal from the quantizer 7 is subjected to an inverse orthogonal transform by a section 11. The adder 12 adds the output signal from the inverse orthogonal transform section 11 and the output signal from the motion compensator 4 representing the reference block. The output signal from the adder 12 is written into the memory 2.

As described previously, the input picture signal is divided into parts which are sequentially written into the segments of the memory 1. The written signal parts are grouped into a predetermined number of blocks, which are sequentially read out from the memory 1 in accordance with the address signal fed from the address generator 13. Each block has a value corresponding to adjacent pixels whose number equals a predetermined integer M multiplied by a predetermined integer N, that is, M×N. For example, the integers M and N are equal to 8.

Figure 2:
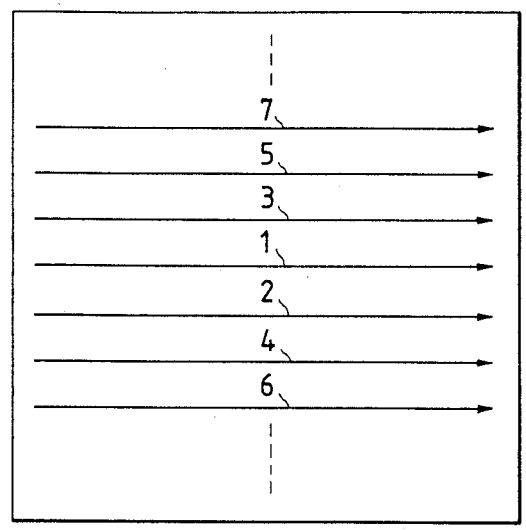
FIG. 2 is a diagram showing the order of reading out the picture signal blocks from the frame memory in the apparatus of FIG. 1.

FIG. 2 shows a sequence of reading the signal from the memory 1. In FIG. 2, the numerals denote orders in the signal reading. As shown in FIG. 2, the signal portion corresponding to the central horizontal line of the picture is read first and the signal portion corresponding to the upper or lower horizontal edge line of the picture is read finally. Specifically, the previously-mentioned signal blocks are separated into groups each having blocks adjacent to each other in the horizontal direction. The block group closest to the center of the picture is read first and the block group remotest from the center of the picture is read finally. In respect of each signal block, the signal parts are read in a predetermined sequence corresponding to a given direction of the picture.

The motion detector 3 compares the pixel data values of the currently-read out block of the present picture signal from the memory 1 and the pixel data values of each block of the 1-frame preceding picture signal from the memory 2, and detects the block of the 1-frame preceding picture signal which has the smallest data value difference with respect to the block of the present picture signal. The motion detector 3 determines a motion vector whose initial point corresponds to the smallest difference block of the 1-frame preceding picture signal and whose terminal point corresponds to the block of the present picture signal. The motion detector 3 outputs a signal representative of the motion vector to the motion compensator 4 and the frame forming section 9.

The motion compensator 4 selects and reads out one of the picture signal blocks of the preceding frame from the memory 2 which has the smallest interframe data difference in accordance with the motion vector fed from the motion detector 3. The motion compensator 4 uses the selected picture signal block of the preceding frame as a reference picture signal block and outputs the reference signal block to the subtractor 5. The subtractor 5 calculates the data difference between the currently-readout block of the present frame and the reference block in unit of pixel.

The difference block pixel values f(x,y) outputted from the subtractor 5 is subjected by the orthogonal transform section 6 to a discrete cosine transform expressed in the following equation (1).

$$F(u,v) = \frac{1}{4} C(u)C(v) \sum_{x=0}^{7} \sum_{y=0}^{7} f(x,y) \times \cos\frac{\pi(2x+1)u}{16} \cos\frac{\pi(2y+1)v}{16} \quad (1)$$

where $C(u), C(v) = 1/\sqrt{2}$ when $u, v = 0$
= 1 otherwise;

F(u,v) denotes transform coefficients;
f(x,y) denotes the difference block pixel values;
x,y denote coordinates in space in the pixel region;
u,v denote coordinates in space in the transform region.

The orthogonal transform section 6 feeds a matrix of the transform coefficients F(u,v) to the adaptive quantizer 7.

The adaptive quantizer 7 quantizes the respective elements of the transform coefficient matrix by use of thresholds which vary with the quantity of codes in the buffer memory 10 and with the position of the currently-quantized signal part relative to the frame. The adaptive quantizer 7 is informed by the buffer memory 10 of the quantity of codes in the buffer memory 10. In addition, the adaptive quantizer 7 is informed by the address generator 13 of the position of the currently-quantized signal part relative to the frame. The quantization thresholds are determined for each group in dependence upon the quantity of codes stored in the memory 10 at the time after the completion of the coding of the preceding group. Even in the case where the quantity of codes stored in the memory 10 remains constant, the thresholds vary with the position of the coded picture signal part relative to the picture. In other words, the picture of a frame is divided into regions in correspondence with the order of the coded signal groups, and the signal quantization is performed with different characteristics for the respective divided regions. To enable this operation, the adaptive quantizer 7 is informed by the address signal from the address generator 13 of the frame region related to the currently-quantized signal part. The quantization characteristics are preferably chosen as to prevent an excessive increase in the quantity of generated codes and also to enable fine quantization in a central region of the picture.

Figure 3:
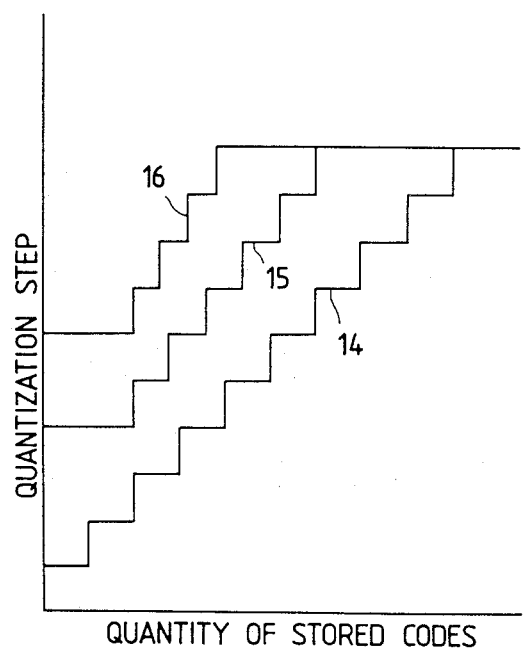
FIG. 3 is a diagram showing the characteristics of the quantization performed by the quantizer of FIG. 1.

FIG. 3 shows one example of the quantization characteristics. In FIG. 3, the numeral 14 denotes the quantization characteristics for the central region of the picture. The numeral 16 denotes the quantization characteristics for the edge region of the picture. The numeral 15 denotes the quantization characteristics for the intermediate region of the picture between the central region and the edge region thereof. In general, the actually-used quantization step increases as the quantity of codes stored in the buffer memory 10 increases. In addition, the quantization step is controlled as follows. The quantization characteristics 14 for the central region have a small lower limit of the quantization step in order to enable fine quantization. The quantization characteristics 16 for the edge region have a large lower limit of the quantization step in order to prevent an excessive quantity of generated codes. The quantization characteristics 15 for the intermediate region are designed so as to reside between the quantization characteristics 13 and 16 in order to enable smooth connection of the central region and the edge region of a reproduced picture. The adaptive quantizer 7 feeds a matrix of the quantized transform coefficients to the encoder 8 and the inverse orthogonal transform section 11.

The encoder 8 converts the matrix of the quantized transform coefficients into codes having a variable length. The encoder 8 feeds the codes to the frame forming section 9. The encoder 8 suspends the coding of the signal when the quantity of codes in the buffer memory 10 exceeds a threshold which varies as a function of the position of the currently-coded signal part relative to the frame. The encoder 8 is informed by the buffer memory 10 of the quantity of codes in the buffer memory 10. In addition, the encoder 8 is informed by the address generator 13 of the position of the currently-coded signal part relative to the frame.

The frame forming section 9 combines the codes and the motion vector into a segment of a frame in a given transmission format. The segment of the frame outputted from the frame forming section 9 is written into the corresponding storage location of the memory 10.

The buffer memory 10 has an apparent capacity which varies as follows. During the coding of the data corresponding to the central region of the picture, the apparent capacity of the memory 10 is large. During the coding of the data corresponding to the edge region of the picture, the apparent capacity of the memory 10 is small. The increase and decrease in the apparent capacity of the buffer memory 10 are realized by respectively increasing and decreasing the threshold which is used in the encoder 8 for determining whether or not the coding of the signal is suspended. The variable apparent capacity of the buffer memory 10 will be further described hereinafter. When the quantity of the codes stored in the buffer memory 10 exceeds a threshold, the encoder 8 suspends the coding of the data in response to a signal from the memory 10 in order to reduce the quantity of the codes stored in the memory 10 below the threshold. Accordingly, this threshold determines a used capacity of the buffer memory 10. As described previously, the threshold varies with the position of the currently-coded signal part relative to the frame. During the coding of the data corresponding to the central region of the picture, since small quantization steps are used, the quantity of the generated codes tends to be large. During this coding, a large threshold is used to increase the apparent capacity of the memory 10 to prevent the increased quantity of the generated codes from causing the suspension of the coding in the encoder 10. During the coding of the data corresponding to the edge region of the picture, since large quantization steps are used and a small threshold is used, the apparent capacity of the memory 10 is small and the quantity of the codes stored in the memory 10 is effectively decreased. In addition, the decreased quantity of the codes allows smaller quantization steps to be used in the coding of the central region of the subsequent frame so that the quality of the reproduced picture can be improved. The way of dividing the region in the buffer memory 10 may be equal to or different from that in the adaptive quantizer 7. The apparent capacity of the memory 10 gradually decreases in the direction from the central region to the edge region of the frame. The codes are sequentially transmitted from the buffer memory 10 to a decoder (not shown) via the transmission line (not shown).

The matrix of the quantized transform coefficients $F(u,v)$ outputted from the adaptive quantizer 7 is subjected by the inverse orthogonal transform section 11 to a discrete cosine transform expressed in the following equation (2).

$$f(x,y) = \frac{1}{4} \sum_{u=0}^{7} \sum_{v=0}^{7} C(u)C(v)F(u,v) \times \cos\frac{\pi(2x+1)u}{16} \cos\frac{\pi(2y+1)v}{16} \tag{2}$$

where $C(u), C(v) = 1/\sqrt{2}$ when $u, v = 0$
       $= 1$ otherwise;

$F(u,v)$ denotes the transform coefficients;
$f(x,y)$ denotes the difference block pixel values;
$x,y$ denote coordinates in space in the pixel region;
$u,v$ denote coordinates in space in the transform region.

As understood from the previous description, the signal group corresponding to the central region of the frame is first subjected to the coding and the edge region of the frame is finally subjected to the coding. In respect of the central region of the frame, the quantization steps are small and the apparent capacity of the memory 10 is large. As a result, a high quality of the central region of the reproduced picture can be obtained. It should be noted that the central region of the picture is generally more important than the edge region of the picture. In respect of the edge region of the frame, the quantization steps are large and the apparent capacity of the buffer memory 10 is small. As a result, a small quantity of the generated codes can be obtained and an efficient code transmission can be realized.

The address generator 13 may include a ROM from which address signals are sequentially read out. The adaptive quantizer 7 may include a ROM from which data of quantization steps are read out in accordance with an address signal determined by the position of the currently-quantized region relative to the frame and the quantity of codes in the buffer memory 10. The buffer memory 10 may include a selector which selects one of different thresholds in accordance with the position of the currently-processed region relative to the frame.

DESCRIPTION OF THE SECOND PREFERRED EMBODIMENT

Figure 4:
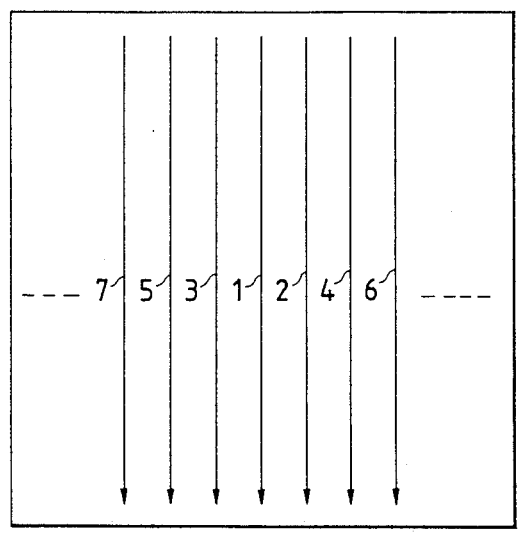
FIG. 4 is a diagram showing an order of reading out picture signal blocks from a frame memory in an apparatus according to a second embodiment of this invention.

FIG. 4 relates to a second embodiment of this invention which is similar to the embodiment of FIGS. 1-3 except for a sequence of reading the signal from the frame memory 1. In FIG. 4, the numerals denote orders in the signal reading. As shown in FIG. 4, the signal portion corresponding to the central vertical line of the picture is read first and the signal portion corresponding to the right-hand or left-hand vertical edge line of the image is read finally.

DESCRIPTION OF THE THIRD PREFERRED EMBODIMENT

Figure 5:
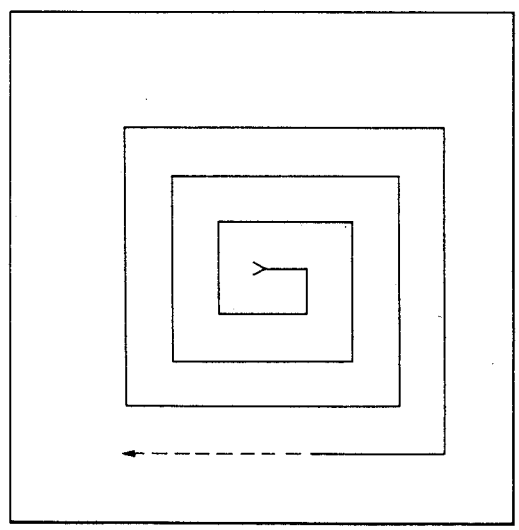
FIG. 5 is a diagram showing an order of reading out picture signal blocks from a frame memory in an apparatus according to a third embodiment of this invention.

FIG. 5 relates to a third embodiment of this invention which is similar to the embodiment of FIGS. 1-3 except for a sequence of reading the signal from the frame memory 1. As shown in FIG. 5, the signal block corresponding to the center of the picture is read first and then other signal blocks are successively read in a sequence corresponding to a spiral line starting from the center toward an edge of the picture. The signal blocks are separated into groups which are arranged along the spiral line.

DESCRIPTION OF THE FOURTH PREFERRED EMBODIMENT

Figure 6:
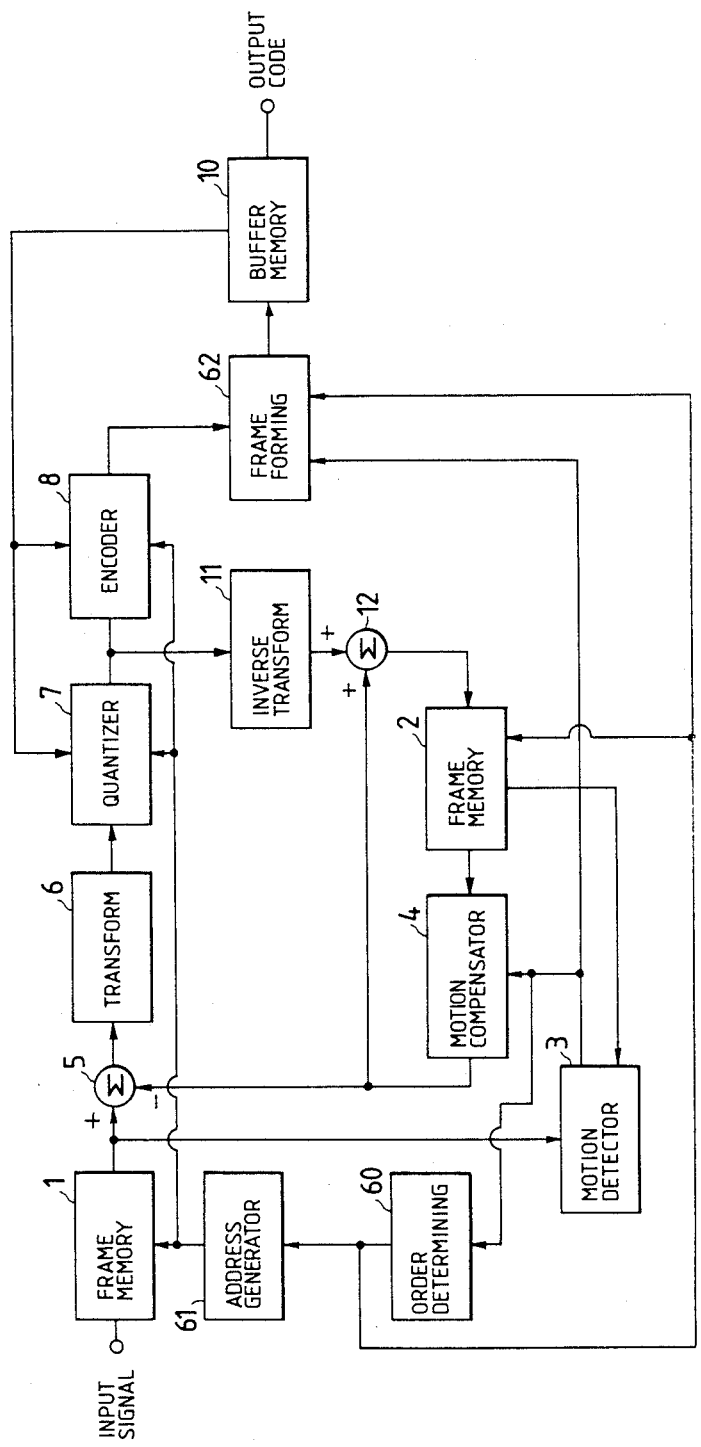
FIG. 6 is a block diagram of an apparatus for coding a moving-picture signal according to a fourth embodiment of this invention.

FIG. 6 shows a fourth embodiment of this invention which is similar to the embodiment of FIGS. 1-3 except for the following points.

In the embodiment of FIG. 6, a scan order generator or a scan order determining section 60 determines a scan order in accordance with the motion vector fed from the motion detector 3 and outputs a signal representative of the determined scan order to an address generator 61. The address generator 61 outputs an address signal to the frame memory 1, the address signal depending on the determined scan order. Segments of the picture signal of one frame are sequentially read out from the frame memory 1 in an order corresponding to the determined scan order.

The scan order signal from the scan order generator 60 is also fed to the frame memory 2. Segments of the picture signal of one frame are sequentially read out from the frame memory 2 in an order corresponding to the determined scan order.

The scan order signal from the scan order generator 60 is also fed to a frame forming section 62. The frame forming section 62 combines the output from the encoder 8, the motion vector, and the scan order of the current frame.

As described previously, the address generator 61 outputs the address signal to the frame memory 1. The address signal is designed so that blocks of the picture signal are sequentially read out from the frame memory 1 in an order determined by the scan order signal fed from the scan order generator 60. Each of the signal blocks has a predetermined number of pixels, for example, MXN pixels (M and N denote predetermined positive integers respectively).

In the address generator 61, one of the block scan orders of FIGS. 2, 4, 5, 7, 8, 9, 10, and 11 is selected in response to the scan order signal from the scan order generator 60, and the address signal is controlled in accordance with the selected block scan order. In each of FIGS. 7-10, the numerals denote orders in the signal reading.

Figure 7:
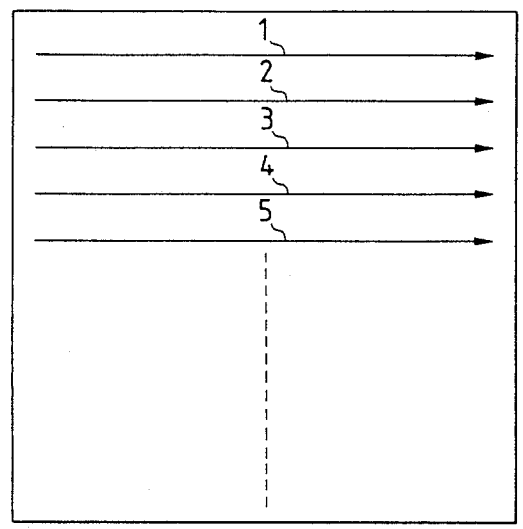

The block scan order of FIG. 7 is designed as follows. The signal blocks are separated into groups each having blocks adjacent to each other in the horizontal direction of the picture. The signal groups are sequentially read out in an order such that the signal portion corresponding to the upper edge of the picture is read first and the signal portion corresponding to the lower edge of the picture is read finally. Within each signal group, the signal blocks are read in a predetermined direction of the picture.

Figure 8:
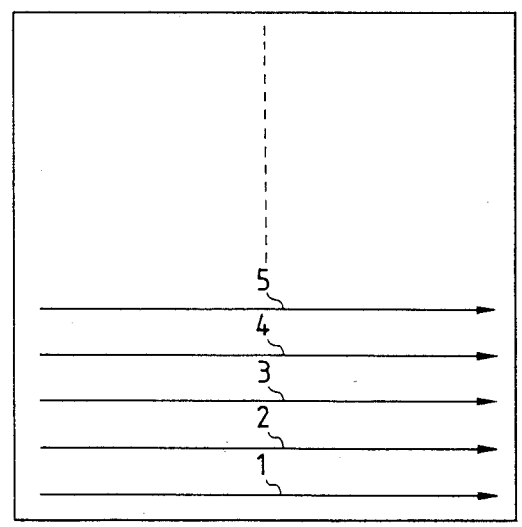

The block scan order of FIG. 8 is similar to the block scan order of FIG. 7 except for the following point. The signal groups are sequentially read out in an order such that the signal portion corresponding to the lower edge of the picture is read first and the signal portion corresponding to the upper edge of the picture is read finally.

Figure 9:
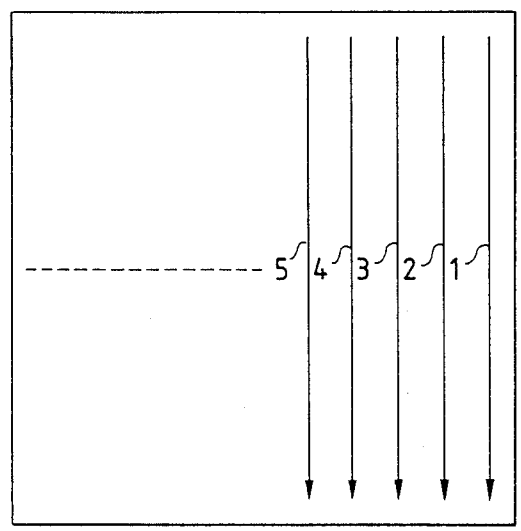

The block scan order of FIG. 9 is designed as follows. The signal blocks are separated into groups each having blocks adjacent to each other in the vertical direction of the picture. The signal groups are sequentially read out in an order such that the signal portion corresponding to the right-hand edge of the picture is read first and the signal portion corresponding to the left-hand edge of the picture is read finally. Within each signal group, the signal blocks are read in a predetermined direction of the picture.

Figure 10:
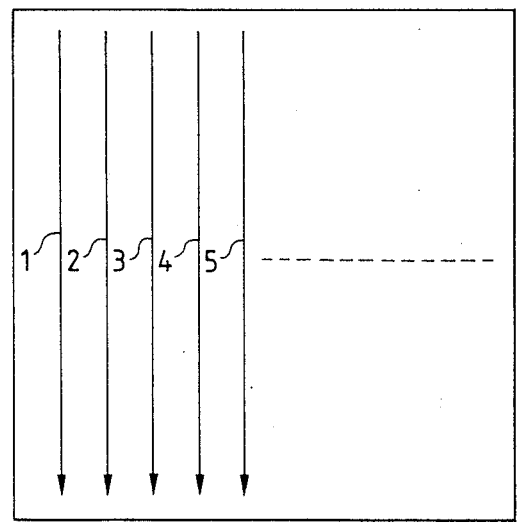

The block scan order of FIG. 10 is similar to the block scan order of FIG. 9 except for the following point. The signal groups are sequentially read out in an order such that the signal portion corresponding to the left-hand edge of the picture is read first and the signal portion corresponding to the right-hand edge of the picture is read finally.

Figures 11, 12:
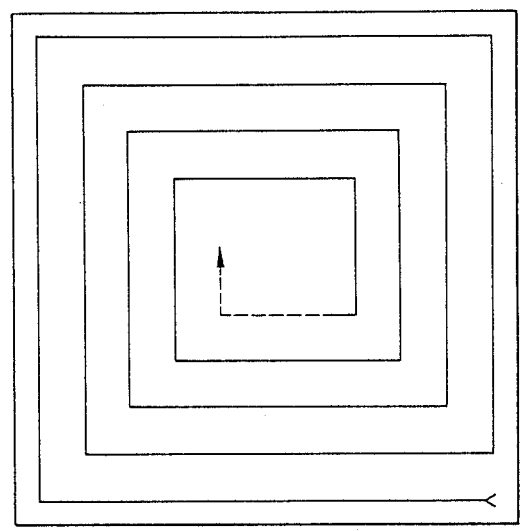

The block scan order of FIG. 11 is designed as follows. The signal blocks are sequentially read out in an order such that the signal block corresponding to a corner of the picture is read first and then other signal blocks are successively read in a sequence corresponding to a spiral line starting from the corner toward the center of the picture. The signal blocks are separated into groups which are arranged along the spiral line.

The frame memory 2 successively outputs the picture signal blocks in a sequence corresponding to the block scan order fed from the scan order determining section 60. The signal blocks which are outputted from the respective frame memories 1 and 2 at the same moment occupy the same positions of the pictures.

The adaptive quantizer 7 quantizes the respective elements of the transform coefficient matrix by use of a variable threshold. This threshold is determined for each group in dependence upon the quantity of codes stored in the memory 10 at the time after the completion of the coding of the preceding group. Even in the case where the quantity of codes stored in the memory 10 remains constant, the threshold varies with the order of the coding of the group. In other words, the image of a frame is divided into regions in correspondence with the order of the coding of the signal groups, and the signal quantization is performed with different characteristics for the respective divided regions. The quantization characteristics are preferably chosen as to prevent an excessive increase in the quantity of generated codes and also to enable fine quantization in an important portion of the picture.

One example of the quantization characteristics is designed as follows. The picture region composed of the signal groups having early orders of the coding uses the quantization characteristics which have a small lower limit of the quantization step, as shown by the line 14 of FIG. 3, in order to enable fine quantization. The picture region composed of the signal groups having late orders of the coding uses the quantization characteristics which have a large lower limit of the quantization step, as shown by the line 16 of FIG. 3, in order to prevent an excessive quantity of generated codes. The picture region composed of the signal groups having intermediate orders of the coding uses the quantization characteristics which reside between the quantization characteristics 14 and 16, as shown by the line 15 of FIG. 3, in order to enable smooth connection of the divided regions of the reproduced picture.

During the coding of the data corresponding to the picture region using the quantization characteristics 16 of FIG. 3, since large quantization steps are used and also the apparent capacity of the buffer memory 10 is small, the quantity of the codes stored in the memory 10 is effectively decreased. In addition, the decreased quantity of the codes allows smaller quantization steps to be used in the coding of the important region of the subsequent frame so that the quality of the reproduced picture can be improved. The way of dividing the region in the buffer memory 10 may be equal to or different from that in the adaptive quantizer 7. The apparent capacity of the buffer memory 10 gradually decreases in the direction from the signal group having an early order of the coding to the signal group having a late order of the coding.

The motion detector 3 informs the scan order generator 60 of the motion vectors for the respective signal blocks sequentially. In order to remove inadequate motion vectors caused by noises in an image pickup system or variations in the luminance, the scan order determining section 60 converts each of the motion vectors into "0" or "1" by use of a suitable threshold. Specifically, effective or appreciable motion vectors are converted into "1". Inadequate motion vectors caused by noises in the image pickup system or variations in the luminance are converted into "0". The distribution of the effective motion vectors in a frame is examined as follows. The scan order generator 60 selects one of reference patterns of FIGS. 12–19 which is closest to the pattern of the two-value motion vectors of a frame. This pattern selection is based on a known pattern matching method. In the patterns of FIGS. 12–19, the image of a frame is composed of 10×10 blocks. The scan order generator 60 finally determines the scan order in accordance with the selected reference pattern. Specifically, when the reference pattern of FIG. 12 is selected, the scan order generator 60 adopts the scan order of FIG. 2. When the reference pattern of FIG. 13 is selected, the scan order generator 60 adopts the scan order of FIG. 4. When the reference pattern of FIG. 14 is selected, the scan order generator 60 adopts the scan order of FIG. 5. When the reference pattern of FIG. 15 is selected, the scan order generator 60 adopts the scan order of FIG. 7. When the reference pattern of FIG. 16 is selected, the scan order generator 60 adopts the scan order of FIG. 8. When the reference pattern of FIG. 17 is selected, the scan order generator 60 adopts the scan order of FIG. 9. When the reference pattern of FIG. 18 is selected, the scan order generator 60 adopts the scan order of FIG. 10. When the reference pattern of FIG. 19 is selected, the scan order generator 60 adopts the scan order of FIG. 11.

As understood from the pairs of the scan orders of FIGS. 2, 4, 5, and 7–11, and the reference patterns of FIGS. 12–19, the signal blocks which correspond to a more greatly moving region of a frame are read out from the frame memory 1 at first and the signal blocks which corresponding to a less moving region of the frame are read out next. As a result, the moving region of the frame is generally quantized with the fine quantization characteristics, and the apparent capacity of the buffer memory 10 is large in this moving region.

The frame forming section 62 combines the codes and the motion vector in each of blocks or in unit of a block. The frame forming section 62 further combines the block scan order with the resultant combination of the codes and the motion vectors in each of frames or in unit of a frame. As a result, the codes outputted from the encoder 7, the motion vectors outputted from the motion detector 3, and the block scan order outputted from the scan order generator 60 are combined into a transmission signal having a given format. The transmission signal outputted from the frame forming section 62 is written into the buffer memory 10.

DESCRIPTION OF THE FIFTH PREFERRED EMBODIMENT

Figure 20:
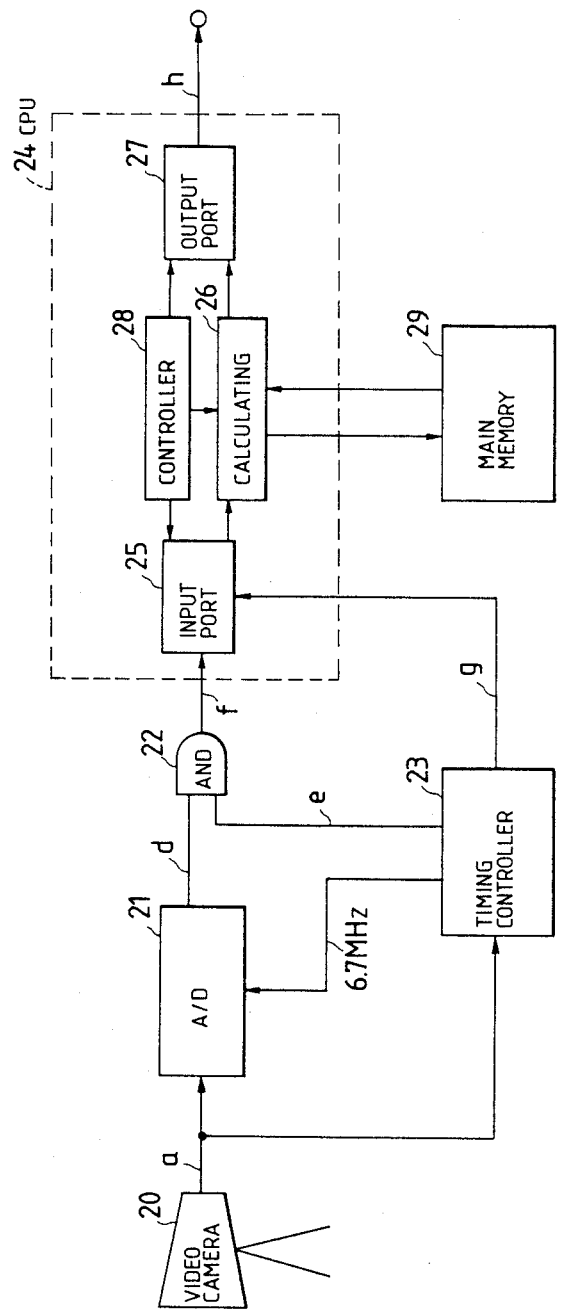
FIG. 20 is a block diagram of an apparatus for coding a moving-picture signal according to a fifth embodiment of this invention.
Figure 21:
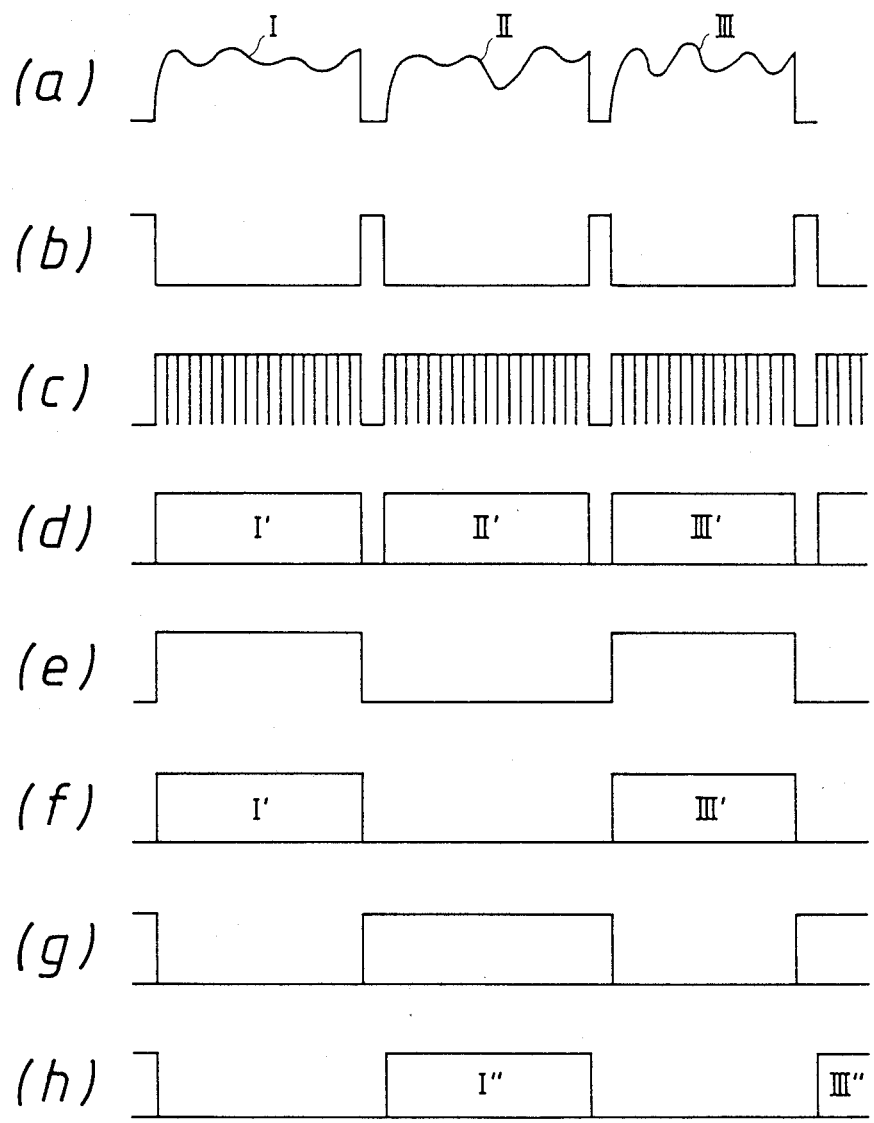
FIG. 21 is a timing diagram of signals in the apparatus of FIG. 20.
Figure 22:
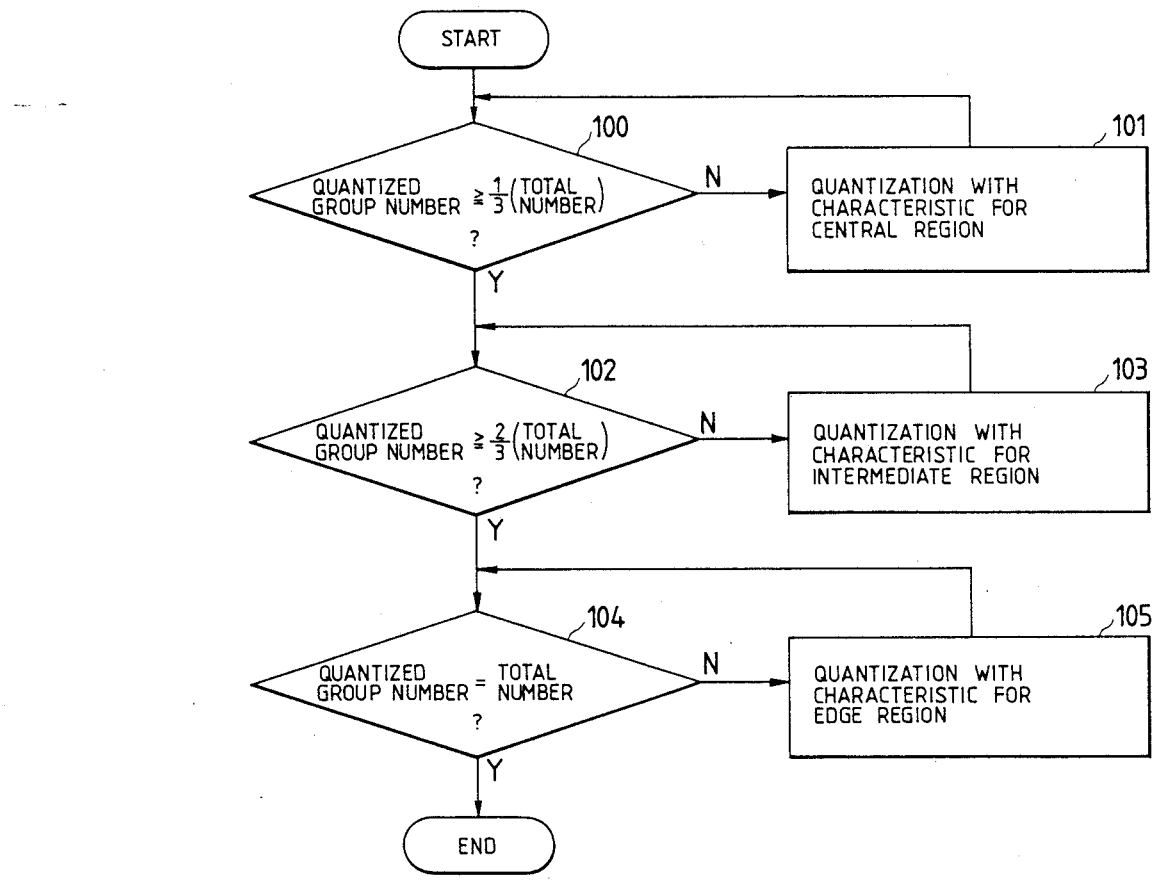
FIG. 22 is a flowchart of a part of a program operating the CPU of FIG. 20.

FIGS. 20–22 relate to a fifth embodiment of this invention which is similar to the embodiment of FIGS. 1–3 except for the following design changes.

With reference to FIG. 20, a video camera 20 outputs an analog video or picture signal "a" to an analog-to-digital (A/D) converter 21 and a timing controller 23. An example of the waveform of the analog picture signal "a" is shown in the part (a) of FIG. 21 where the characters I, II, and III denote frames. The analog picture signal "a" is converted by the device 21 into a corresponding digital picture signal "d". One example of the digital picture signal "d" is shown in the part (d) of FIG. 21 where the characters I', II', and III' denote frames corresponding to the respective frames I, II, and III in the part (a) of FIG. 21. The digital picture signal "d" is applied to a first input terminal of an AND circuit 22 which serves as a gate.

The timing controller 23 derives a vertical sync signal "b" and a horizontal sync signal "c" from the analog picture signal "a". Examples of waveforms of the vertical sync signal "b" and the horizontal sync signal "c" are shown in the parts (b) and (c) of FIG. 21 respectively. The timing controller 23 generates a fixed-frequency sampling control signal on the basis of the horizontal sync signal "c". For example, the frequency of the sampling control signal is 6.7 MHz. The sampling control signal is fed to the A/D converter 21. In the A/D converter 21, the analog picture signal "a" is sampled at a timing determined by the sampling control signal and the sampled analog picture signal is converted into the corresponding digital picture signal "d".

The timing controller 23 generates a frame-dependent gate signal "e" on the basis of the vertical sync signal "b". As shown in the part (e) of FIG. 21, the gate signal "e" assumes a value of "1" during odd-numbered frames and assumes a value of "0" otherwise. The gate control signal "e" is fed to a second input terminal of the AND circuit 22. The AND circuit 22 controls the transmission of the digital picture signal "d" in accordance with the gate signal "e" and passes only the odd-numbered frames I', III', . . . of the digital picture signal "d" to a CPU 24. The AND circuit 22 outputs a signal "f" such as shown in the part (f) of FIG. 21.

The timing controller 23 generates a frame-dependent control signal "g" on the basis of the vertical sync signal "b". As shown in the part (g) of FIG. 21, the control signal "g" assumes the valve "1" during even-numbered frames and assumes the valve "0" otherwise. The control signal "g" is fed to the CPU 24. The CPU 24 processes the odd-numbered frames I', III', ... of the digital picture signal "d" into corresponding frames I", III", ... of a digital picture signal "h" which are outputted during the intervals of the even-numbered frames of the digital picture signal "d" as shown in the part (h) of FIG. 21.

The CPU 24 includes a combination of an input port 25, a processing or calculating section 26, an output port 27, and a controller 28. The controller 28 has a ROM and controls the devices 25-27 in accordance with a program stored in the ROM. The CPU 24 is connected to a main memory 29 corresponding to the frame memories 1 and 2 of FIG. 1.

The CPU 24 operates in accordance with a program stored in the internal ROM. The CPU 24 sequentially writes segments or blocks of the digital picture signal "f" into respective storage locations of the main memory 29. The CPU 24 sequentially reads out the signal blocks from the main memory 29 in a reading order determined by the program. This reading order is similar to the reading order of one of FIGS. 2, 4, and 5, so that a central portion of a frame is read at first, an intermediate portion of the frame is read secondly, and an edge portion of the frame is read thirdly.

The CPU 24 performs the operation of the motion detector 3 of FIG. 1 by executing the algorithm in the page A-1 of CCITT, SGXV, "Description of Ref. Model 5 (RM5)", 1988 Mar. 17. The CPU 24 performs the operations of the orthogonal transform section 6 and the inverse orthogonal transform section 11 of FIG. 1 by executing the algorithms in the page 13 of CCITT, SGXV, "Description of Ref. Model 5 (RM5)", 1988 Mar. 17.

The program operating the CPU 24 has a part corresponding to the operation of the quantizer 7 of FIG. 1. FIG. 22 shows a flowchart of this part of the program. As shown in FIG. 22, a first step 100 of the part of the program compares the number of groups, which were already quantized, with one third of the total number of groups. When the number of quantized groups is smaller than one third of the total group number, the program advances to a step 101 which quantizes the current signal with the quantization characteristics 14 of FIG. 3. After the step 101, the program returns to the step 100. When the number of quantized groups is not smaller than one third of the total group number, the program advances from the step 100 to a step 102. The step 102 compares the number of groups, which were already quantized, with two thirds of the total number of groups. When the number of quantized groups is smaller than two thirds of the total group number, the program advances to a step 103 which quantizes the current signal with the quantization characteristics 15 of FIG. 3. After the step 103, the program returns to the step 102. When the number of quantized groups is not smaller than two thirds of the total group number, the program advances from the step 102 to a step 104. The step 104 compares the number of groups, which were already quantized, with the total number of groups. When the number of quantized groups is smaller than the total group number, the program advances to a step 105 which quantizes the current signal with the quantization characteristics 16 of FIG. 3. After the step 105, the program returns to the step 104. When the number of quantized groups equals the total group number in the step 104, the part of the program ends.

As described previously, a central portion, an intermediate portion, and an edge portion of a frame is sequentially read out from the main memory 29. Accordingly, the comparison between the quantized group number with the total group number or the fractions of the total group number which is executed by the steps 100, 102, and 103 determines whether the current signal part resides in the central portion, the intermediate portion, or the edge portion of the frame. When the current signal part resides in the central portion of the frame, the current signal part is quantized by the step 101 with the characteristics 14 of FIG. 3. When the current signal part resides in the intermediate portion of the frame, the current signal part is quantized by the step 103 with the characteristics 15 of FIG. 3. When the current signal part resides in the intermediate portion of the frame, the current signal part is quantized by the step 105 with the characteristics 16 of FIG. 3.

The CPU 24 performs the operation of the encoder 8 of FIG. 1 by executing the algorithm in the pages 16-18 of CCITT, SGXV, "Description of Ref. Model 5 (RM5)", 1988 Mar. 17. The CPU 24 performs the operation of the frame forming section 9 of FIG. 1 by executing the algorithm in "5 Video multiplex coding", pages 69-72 of CCITT, RED BOOK VOLUME III-FASCILE III 4, Oct. 1984. The CPU 24 calculates the quantization step Q by referring to the equation "$Q=2 \times INT(32 \times BF/A)+2$" where the character BF denotes the buffer memory remaining capacity and the character A denotes the apparent buffer memory capacity.

DESCRIPTION OF THE SIXTH PREFERRED EMBODIMENT

Figure 23:
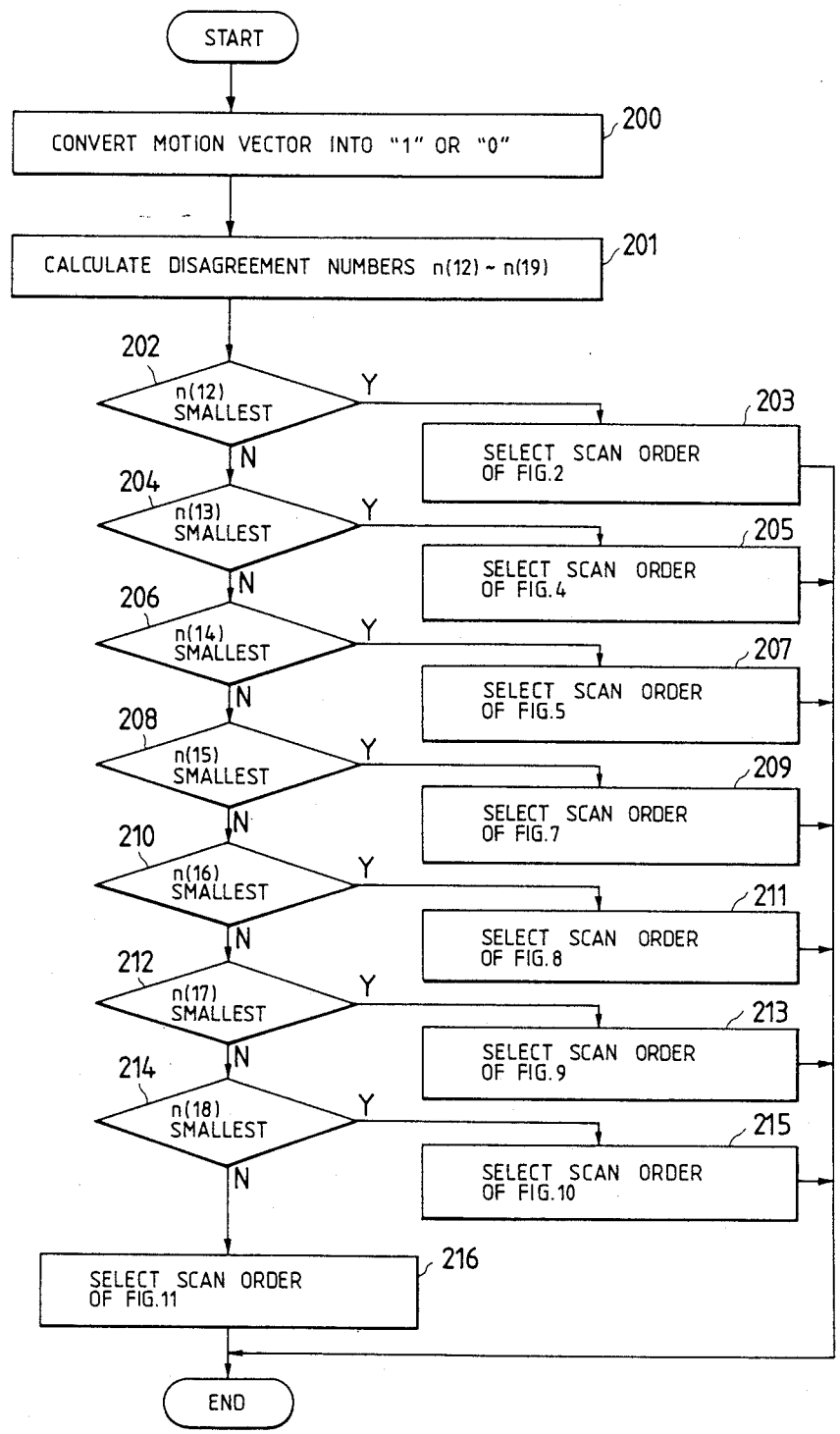
FIG. 23 is a flowchart of a part of a program operating a CPU in an apparatus of a sixth embodiment of this invention.

FIG. 23 relates to a sixth embodiment of this invention which is similar to the embodiment of FIGS. 6-19 except for the following design changes.

The sixth embodiment has a hardware design similar to that of FIG. 20. A program operating a CPU 24 of the sixth embodiment has a part corresponding to the operation of the scan order determining section 60 of FIG. 6. FIG. 23 is a flow chart of this part of the program.

As shown in FIG. 23, a first step 200 of the part of the program converts motion vectors into "1" or "0". A step 201 following the step 200 compares a set of two-value motion vectors of the current frame with each of patterns of FIGS. 12-19. The step 201 calculates the number of motion vectors of the current frame which disagree with the corresponding blocks of each of patterns of FIGS. 12-19. The characters n(12)-n(19) denote the disagreement block numbers concerning the patterns of FIGS. 12-19 respectively. Data corresponding to the patterns of FIGS. 12-19 are stored in a main memory 29 (see FIG. 20), an internal memory in the CPU, or another external memory.

A step 202 following the step 201 determines whether or not the number n(12) is the smallest among the numbers n(12)-n(19). When the number n(12) is the smallest, the program advances to a step 203 which selects the block scan order of FIG. 2. When the number n(12) is not the smallest, the program advances to a step 204. The step 204 determines whether or not the number n(13) is the smallest among the numbers n(12)-n(19). When the number n(13) is the smallest, the program advances to a step 205 which selects the block scan order of FIG. 4. When the number n(13) is not the smallest, the program advances to a step 206. The step 206 determines whether or not the number n(14) is the smallest among the numbers n(12)-n(19). When the number n(14) is the smallest, the program advances to a step 207 which selects the block scan order of FIG. 5. When the number n(14) is not the smallest, the program advances to a step 208. The step 208 determines whether or not the number n(15) is the smallest among the numbers n(12)-n(19). When the number n(15) is the smallest, the program advances to a step 209 which selects the block scan order of FIG. 7. When the number n(15) is not the smallest, the program advances to a step 210. The step 210 determines whether or not the number n(16) is the smallest among the numbers n(12)–n(19). When the number n(16) is the smallest, the program advances to a step 211 which selects the block scan order of FIG. 8. When the number n(16) is not the smallest, the program advances to a step 212. The step 212 determines whether or not the number n(17) is the smallest among the numbers n(12)–n(19). When the number n(17) is the smallest, the program advances to a step 213 which selects the block scan order of FIG. 9. When the number n(17) is not the smallest, the program advances to a step 214. The step 214 determines whether or not the number n(18) is the smallest among the numbers n(12)–n(19). When the number n(18) is the smallest, the program advances to a step 215 which selects the block scan order of FIG. 10. When the number n(18) is not the smallest in the step 214, that is, the number n(19) is the smallest among the numbers n(12)–n(19), the program advances to a step 216 which selects the block scan order of FIG. 11. After the steps 203, 205, 207, 209, 211, 213, 215, and 216, the part of the program ends.

The CPU 24 sequentially reads out the signal blocks from the main memory 29 in a reading order selected by one of the steps 203, 205, 207, 209, 211, 213, 215, and 216.

What is claimed is:

1. An apparatus for coding a moving-picture signal, comprising:
   a first memory temporarily memorizing an input picture signal of one frame;
   means for firstly reading out a block of the picture signal, which corresponds to a central portion of the frame, from the first memory and then sequentially reading out other blocks of the picture signal from the first memory in a predetermined order, wherein each of the blocks of the picture signal has a predetermined number of adjacent pixels;
   means for transforming each block of the picture signal read out from the first memory into transmission information;
   a second memory storing the transmission information and having a capacity which adaptively varies with a position of the block relative to the frame; and
   a quantizer adaptively quantizing an output from the transforming means in accordance with a quantity of the transmission information stored in the second memory and with the position of the block relative to the frame,
   wherein the quantizer more finely quantizes the output from the transforming means as a corresponding region of the frame has a greater motion.

2. An apparatus for coding a moving-picture signal, comprising:
   a first memory temporarily memorizing an input picture signal of one frame;
   means for determining an order of reading out the picture signal from the first memory in accordance with a distribution of motion vectors in a preceding frame;
   mean for sequentially reading out blocks of the picture signal from the first memory in the determined reading order, wherein each of the blocks of the picture signal has a predetermined number of adjacent pixels;
   means for converting each block of the picture signal read out from the first memory into transmission information;
   a second memory storing the transmission information and having a capacity which adaptively varies with an order of coding of the picture signal block; and
   a quantizer adaptively quantizing an output from the converting means in accordance with a quantity of the transmission information stored in the second memory and with the order of coding of the picture signal block.

3. The apparatus of claim 2 wherein the second memory has a storage area corresponding to each of regions of the frame, and the storage area increases as the corresponding block has a greater motion.

4. The apparatus of claim 2 wherein the quantizer more finely quantizes the output from the converting means as a corresponding region of the frame has a greater motion.

5. The apparatus of claim 2 wherein the order determining means comprises means for determining a greatly moving region on the basis of motion vectors of the picture signal blocks by use of a pattern matching method.

6. An apparatus for coding a moving-picture signal, comprising:
   a first memory temporarily memorizing an input picture signal of one frame;
   means for sequentially reading out blocks of the picture signal from the first memory in a varible reading order, wherein a complete set of the blocks composes one frame and each of the blocks of the picture signal has a predetermined number of adjacent pixels;
   means for detecting a distribution of motion vectors in a preceding frame;
   means for varying the reading order in accordance with the detected distribution of the motion vectors;
   means for transforming each block of the picture signal read out from the first memory;
   means for quantizing an output from the transforming means with a variable quantizing characteristic;
   encoder coding an output from the quantizer into codes;
   a second memory storing the codes;
   means for varying the quantizing characteristic in accordance with a quantity of the codes stored in the second memory and with a relation between the reading order and a signal block corresponding to the output from the transforming means which is being quantized by the quantizing means;
   means for suspending the coding by the encoder when the quantity of the codes stored in the second memory exceeds a variable threshold; and
   means for varying the threshold in accordance with a relation between the reading order and a signal block corresponding to the output from the quantizer which is being coded by the encoder.

* * * * *